Nov. 15, 1938.      M. O. TRUDEAU      2,136,530
OPERATING CONTROL FOR FLUID DISPENSING APPARATUS
Filed April 19, 1937      3 Sheets-Sheet 2
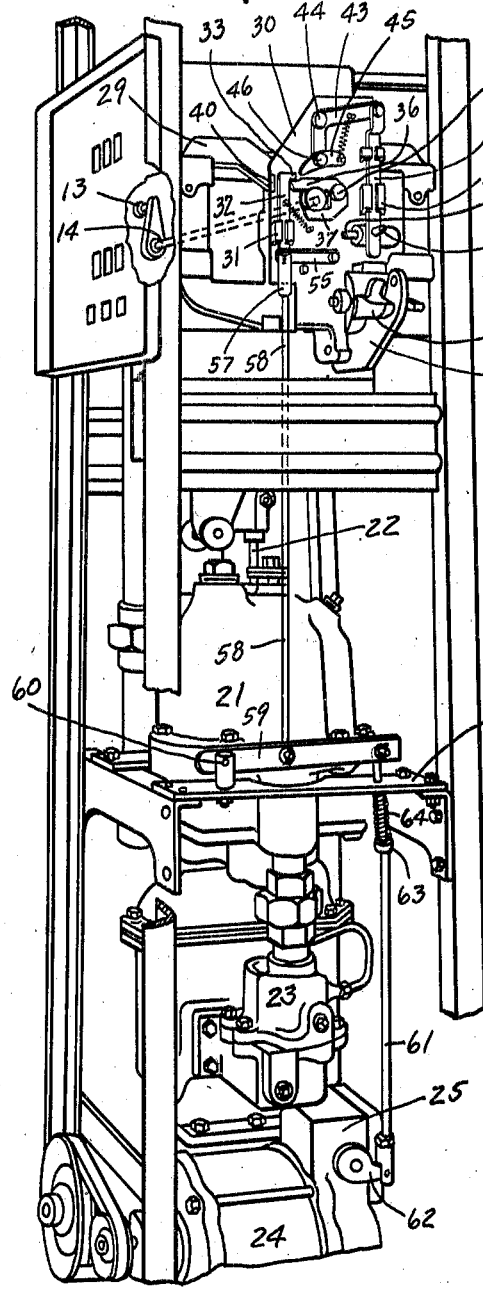
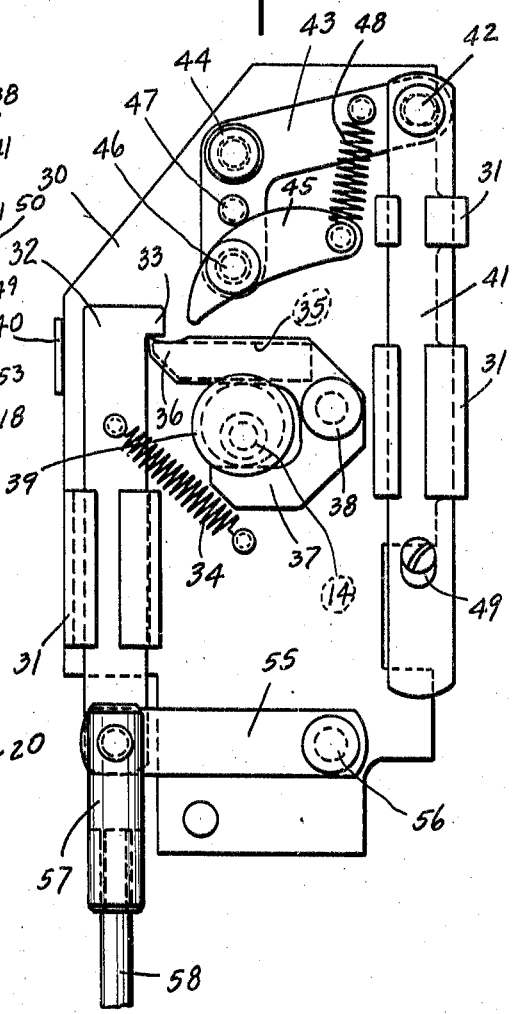
INVENTOR.
MAXIMILLIAN O. TRUDEAU,
BY
Lockwood Goldsmith & Galt.
ATTORNEYS.

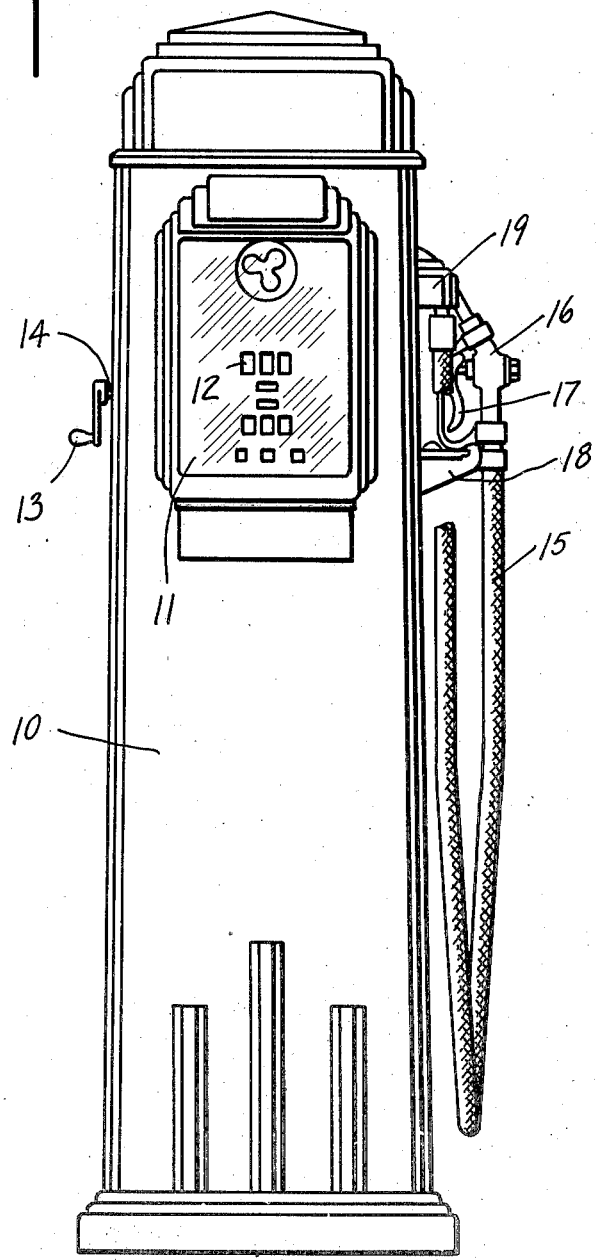

Nov. 15, 1938.　　　　M. O. TRUDEAU　　　　2,136,530
OPERATING CONTROL FOR FLUID DISPENSING APPARATUS
Filed April 19, 1937　　　3 Sheets-Sheet 3
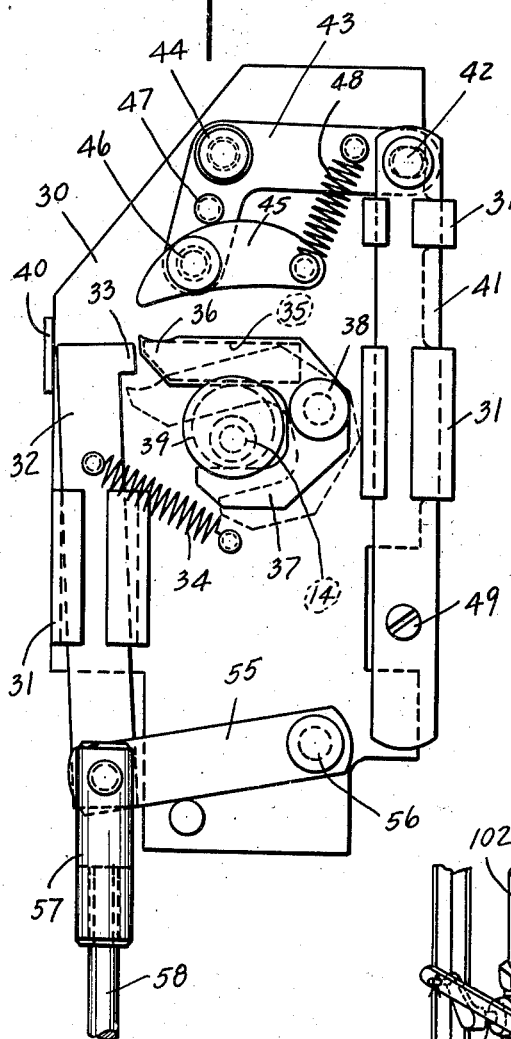
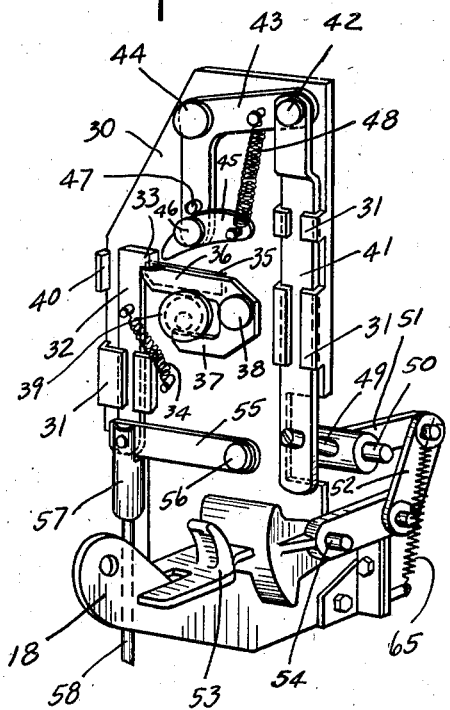
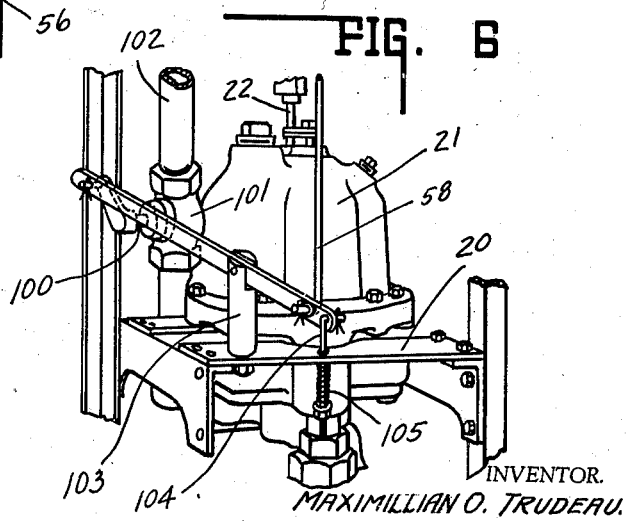
INVENTOR.
MAXIMILLIAN O. TRUDEAU.
BY
Lockwood Goldsmith & Galt
ATTORNEYS.

Patented Nov. 15, 1938

2,136,530

UNITED STATES PATENT OFFICE 2,136,530

OPERATING CONTROL FOR FLUID DISPENSING APPARATUS

Maximillian O. Trudeau, Fort Wayne, Ind., assignor to Tokheim Oil Tank and Pump Company, Fort Wayne, Ind., a corporation Application April 19, 1937, Serial No. 137,645

14 Claims. (Cl. 221—95)

This invention relates to a control mechanism for a fluid dispensing apparatus, and is particularly applicable to gasoline pumps known as computer pumps, and which are provided with a resettable computer.

In computer pumps there is provided a meter through which the liquid passes upon being dispensed, the meter operating a computer mechanism which computes and indicates the quantity and monetary value of fluid dispensed at each transaction. Thus, it is essential that before or after each transaction the computer be reset to its initial or zero position. This is usually accomplished through the medium of a hand-operated crank. In such pumps it has heretofore been the practice to provide an interlocking device in the form of an obstruction to the switch which controls the motor pumping circuit, so that said switch cannot be operated to close the circuit other than when the computer has been reset to zero.

In such an arrangement a number of manual operations must be performed by the attendant in effecting the delivery of the fluid or gasoline in a single transaction. The resetting crank must be manually operated to reset the computer. The nozzle must be removed from its support. A switch lever must be manually actuated to close the circuit to the starting motor. Delivery is made, and the nozzle placed upon its support, automatically operating the switch to close the circuit through the motor. Thus, there are four operations required. However, if the operator has failed to reset the mechanism, the number of operations is increased. He removes the nozzle and attempts to manually operate the switch, but is prevented therefrom by the interlock device. He must then stop and reset the computer, again operate the switch, and after the liquid is dispensed, return the nozzle to circuit-breaking and supporting position. This requires five operations.

It is the purpose of this invention to so combine the reset operation with the switch actuating operation as to eliminate the necessity of providing an interlock device, reduce the operations to not more than three under any circumstances, and require the operator to actuate the reset mechanism in dispensing the liquid. The separate operation in actuation of the switch, either effectively or ineffectively, is eliminated. The switch for closing the circuit to the pump motor is actuated by the reset operation, and thereafter the switch is automatically actuated to break the circuit upon replacing the nozzle upon its support. Thus, instead of at least four and possibly five operations required of the operator, there are only three manual operations.

Another feature of the invention resides in the arrangement for actuating the switch to close the circuit and start the pumping motor during the reset operation and before the completion thereof, so that the pumping action gets under way before the reset operation has been finally completed or the computing mechanism reset to zero or initial position. The meter and delivery line will be filled by the pump ready for operation before the operator is ready to dispense the liquid following the reset to zero.

A further advantage of the invention resides in the fact that the reset must be operated just prior to a dispensing transaction so that the customer will ordinarily be present to observe that the operator resets the computer before he makes the delivery, whereas heretofore the resetting operation may or may not have been effected under the observation of the customer.

A further feature of the invention resides in the actuating mechanism, whereby an operating plunger is actuated for movement to one position by the resetting of the computer and to another position by a nozzle actuated lever, the positioning of the plunger acting to make or break the pump motor circuit, or, as an alternative, actuate a control valve in the dispensing line or operate a signal device.

Other objects and features of the invention will be understood from the accompanying drawings and the following description and claims:

Fig. 1 is a front elevation of a computer pump. Fig. 2 is a perspective view of the interior pumping mechanism and frame support with parts broken away and removed. Fig. 3 is a front elevation of the actuating mechanism showing the parts thereof in fluid-dispensing position. Fig. 4 is the same as Fig. 3 showing the parts in non-dispensing position. Fig. 5 is a perspective view of the mechanism shown in Fig. 3 with the parts in dispensing position. Fig. 6 is a view of a portion of the pump showing a modified form as applied to a valve.

For illustration of one application of the invention there is shown in the drawings a gasoline pump housing 10 having a face 11 provided with apertures 12 through which the computer numerals are visible. On one side of the pump there is a manually actuated crank 13 which rotates a computer resetting shaft 14. On the other side of the pump there is illustrated a dispensing hose 15 having a nozzle 16 with a hand-operated valve lever 17. The nozzle 16 is adapted to be supported in inoperative position by a projecting support 18 so that the discharge end of the nozzle extends into and is protected by a hood 19.

Within the housing 10 and upon a frame member 20 there is supported a liquid meter 21 which drives the computer mechanism through a shaft 22. In communication with the meter 21 there is a pump 23 driven by an electric motor 24, which motor is operated by a switch 25, whereby upon closing of the circuit from a source of current not illustrated, the motor 24 is energized and liquid is pumped from a suitable reservoir by the pump 23 through the meter 21, hose 15 and nozzle 16. When the valve 17 of the nozzle is closed, the liquid is prevented from passing through the meter, but is by-passed by the pump back to the reservoir or circulated within the pump. Thus, the meter and computer mechanism only operate when the liquid is permitted to pass through the nozzle 16.

The foregoing structure, together with the computer and including the reset mechanism operated by the shaft 14, is well known and understood in the art and is in common use, wherefore the description of the computer and reset mechanism need not be herein described in detail.

Supported upon the framework within the housing 10 and upon the side thereof from which the support 18 extends, there is provided a supporting frame 29 to which is secured a base plate 30 having formed on the face thereof a plurality of guides 31. In one pair of said guides an actuating plunger 32 is slidably mounted in vertical position so as to have both vertical and lateral sliding movement with respect to the plate 30. Said plunger is provided with a head 33 which in elevated position of the plunger is drawn by the tension of a spring 34 over and is supported by a shoulder 35 in the form of a plate or embossment extending outwardly from the face of the plate 30. Said head is so positioned as to be engaged by a finger 36 in the form of a U-shaped lever having a follower 37, said finger being pivoted to the plate 30 at 38.

The finger 36 is raised and lowered about its pivotal mounting 38 by engagement therewith of an eccentric shoe 39 secured to the end of the shaft 14 which is driven by the reset mechanism and which is manually operated by the handle 13. Extending outwardly from the plate 30 there is a projection 40 formed on the edge thereof which acts as a stop to prevent extreme movement of the plunger 32 away from the finger 36 and shoulder 35, the spring 34 tending to pull the plunger inwardly for engagement with said shoulder and finger.

On the other side of the plate and slidable in the guides 31 there is an operating bar 41, to the upper end of which there is pivotally connected at 42 one end of a bell crank 43. Said bell crank is pivoted to the plate 30 intermediate its ends at 44. The bell crank is so mounted upon the plate that its free end extends downwardly toward the finger 36 and has pivotally mounted thereon a trip pawl 45 pivoted on the bell crank at 46. The bell crank is provided with a stop pin 47 for limiting the pivotal movement of the pawl, one end of which is connected by a spring 48 with the bell crank.

When the bell crank and pawl are in normal operative position, as shown in Fig. 3, downward movement of the bar 41 moves the pawl forward through the movement of the bell crank so that the nose of the pawl engages the head 33 on the plunger 32, forcing it against the stop 40 and away from the shoulder 35 and finger 36. For this purpose, bar 41 is moved downwardly by an operating lever 49 extending through an aperture in the bar from a rock shaft 50, which extends through and is rotatably mounted in suitable bearings in the frame 29. For rocking the shaft 50 there is keyed thereto an arm 51 which is connected by a link 52 to the free end of a nozzle-actuated lever 53 fulcrumed between its ends at 54. Said lever is associated with the nozzle support 18 so as to be engaged by the nozzle and depressed when the nozzle is replaced upon the nozzle support 18. Thus, upon depressing the lever 53, the bar 41 will be moved downwardly through the lever 49 so as to move the pawl forwardly for kicking the plunger 32 free from the shoulder and finger in released position.

The lower end of the plunger 32 is pivotally connected to a link 55 having its opposite end pivoted at 56 to the plate 30. Also pivoted to the lower end of said plunger there is a clevis 57 to which a rod 58 is removably secured. Said rod extends downwardly and has its lower end pivotally connected to a lever 59 intermediate its ends. One end of the lever is pivoted at 60 to the frame member 20. The free end thereof is connected to a rod 61 having its lower end pivoted to a switch lever 62 mounted exteriorly of the switch box 25 acting to make and break the electric circuit to the pump motor 24. The rod 61 is provided with a collar 63 for supporting a compression spring 64 between said collar and the underside of the frame member 20.

*Operation*

In operation, the position of rest of the pump structure is illustrated as in Fig. 1, wherein the nozzle 16 is resting upon the support 18 and depressing the lever 53. It may be assumed that due to the preceding dispensing operation, the computer has been actuated to show delivery of a certain number of gallons of liquid, and perhaps the price thereof. For making the next delivery, the nozzle 16 is removed from the support 18 by the operator. However, the nozzle may be left on the hook until after the motor is started and the computer has been reset to zero. To start the motor pump 24, the operator turns the shaft 14 through the hand crank 13. During the turning of the shaft 14 the motor switch closes the circuit so that the pump begins to operate, as hereinafter described. Continued rotation of the shaft 14 resets the computing mechanism to its initial or zero position. The liquid being thereby pumped to the meter and nozzle, and the computing mechanism having been reset to zero, the control valve 17 of the nozzle may be actuated to permit flow of the liquid through the meter as it is dispensed. The flow through the meter will actuate the computer through the shaft 22 to register the quantity dispensed and perhaps the monetary value thereof. Upon completion of the delivery, the valve 17 is closed and the nozzle hung upon the support 18, thereby depressing the lever 53 which will cause the circuit to the motor to be broken in the manner hereinafter described. The apparatus is then at rest, awaiting the next dispensing operation with the computed figures for the completed operation showing. The above sequence of operations will again be followed in effecting the next operation.

The actuating mechanism is shown in Fig. 3 with the circuit open and in Fig. 4 with the circuit closed. Operation of the reset shaft 14 rotates the eccentric 39 to lower the finger 36 below the head 33 of the plunger 32 and then raises said finger which engages under the head and lifts the plunger 32 so that the spring 34 will pull the head into engagement with the shoulder 35 upon which it is thereby supported against the tension of the spring 64 (Fig. 2). In this position the rod 61 is elevated, which moves the switch 25 to circuit closing position through the arm 62. The pump motor is thereby started and continues to operate during such time as the plunger is in its elevated position.

The lever 53, being released by the nozzle while the liquid is being dispensed, is held in raised position by a spring 65, which, through the linkage, oscillating shaft 50 and lever 49, raises the bar 41 which actuates the bell crank 43 to retract the pawl 45 to the position shown in Fig. 4. After the dispensing transaction is completed, the operator, upon hanging the nozzle upon its support 18, causes it to engage and depress the lever 53 against the tension of spring 65, causing the lever 49 to lower the bar 41 and through the bell crank 43 move the pawl 45 forwardly against the plunger head 33. This movement kicks the plunger head laterally against the stop 40 so it is released from engagement with the shoulder 35. The release of the plunger enables the spring 64 to act upon rod 61 for moving the switch lever 62 to circuit breaking position so that the pumping action will be discontinued.

The eccentric or cam 39 is so positioned on the reset shaft 14 that the rotation of the shaft during the resetting operation of the computer will lower and raise the finger 36 to elevate the plunger 32 and close the circuit to the motor during the resetting operation and before the completion thereof for the reasons above set forth. Thus, wherein the resetting operation may require slightly more than one complete revolution of the shaft 14, the eccentric or cam 39 may be so positioned thereon that it reaches its circuit closing position upon the reset shaft 14 being rotated 180 to 270 degrees, so that during the remaining 90 or more degrees of rotation to complete the resetting operation, the pump motor is energized.

The actuating mechanism may in the same manner be effective in opening and closing a valve for controlling the liquid dispensing operation, wherein such arrangement may be more desirable for some purposes. Thus, the pumping motor may be energized in the usual manner by a hand-operated switch, and, as shown in the modified Fig. 6, the rod 58, extending downwardly from the plunger 32, may be connected with a valve lever 100 operating in a valve housing 101 positioned in the liquid dispensing line 102 so that when the plunger 32 is in its lower position, as above described, the valve will be closed, and when elevated by the finger 36, the valve will be open. The rod 58 is connected with the lever 100 through the fulcrum pivoted at 103. The fulcrum is provided with a rod 104 upon which a spring 105 is mounted for normally holding the plunger in lowered position.

Similarly, if it is desirable to lock the motor operating switch or any other movable part of the dispensing apparatus, the plunger 32 or rod 58 may be utilized as a sliding bolt or key member such that when the plunger is in its lowered position such moving parts will be locked against operation and when the plunger is elevated, as above described, such parts will be released.

While the invention has been particularly described as applied to a gasoline or liquid dispensing pump, it is equally applicable to other types of fluid pumps wherein a computer mechanism is provided and is required to be reset to initial position preceding each fluid dispensing transaction.

The invention claimed is:

1. In a switch-controlled motor-driven fluid-dispensing apparatus having a meter operable resettable computer and a delivery means, an actuating member, a cam operated by the resetting of said computer for moving said member to one position, means operated by said delivery means for causing said member to move to another position, and means connected with said member for controlling said dispensing apparatus.

2. In a switch-controlled motor-driven fluid-dispensing apparatus, a meter operable resettable computer, a pump for forcing fluid through said meter, a switch controlled motor for driving said pump, an actuating member connected with said switch, a cam operated by the resetting of said computer for causing said member to actuate the switch and drive said pump and means operable independently of said cam to actuate the switch for stopping the operation of the pump.

3. A switch-controlled motor-driven fluid-dispensing apparatus having a pump, a motor for driving said pump, a meter through which fluid is circulated by said pump, a computer driven by said meter, means for resetting said computer to initial position after a dispensing operation, a rotatable shaft operable to complete the resetting operation, a cam on said shaft, mechanism actuated by said cam for closing said switch to cause the pump to operate, said cam being so positioned on said shaft as to effect the closing of the switch during the resetting operation and prior to the completion thereof and means operable independently of said cam for opening said switch to discontinue the operation of the pump.

4. In a switch-controlled motor-driven fluid-dispensing apparatus having a meter, a delivery means, a pump for forcing fluid through said meter to the delivery means, a computer driven by said meter, a reset mechanism for returning said computer to initial position, a shaft for driving said reset mechanism, a cam on said shaft, and means actuated by said cam for effecting delivery of fluid when in one position and discontinuing delivery thereof when in another position.

5. In a switch-controlled motor-driven fluid-dispensing apparatus having a meter, a delivery means, a pump for forcing fluid through said meter to the delivery means, a computer driven by said meter, a rest mechanism for returning said computer to initial position, a shaft for driving said reset mechanism, a cam on said shaft, a member actuated by said cam for effecting delivery of fluid when in one position, said cam becoming effective during the resetting operation to permit delivery prior to the completion of the resetting operation, and means for actuating said member independently of said cam to discontinue fluid delivery.

6. Control mechanism for a fluid-dispensing apparatus having a delivery line through which fluid is caused to pass under pressure, a meter in said line, a computer driven by said meter, means for resetting said computer to initial position, a shaft rotatable for actuating said resetting means, a cam on said shaft, means actuated by said cam during the resetting operation for causing the passage of fluid through said meter and independently actuated means for discontinuing said passage of fluid.

7. Control mechanism for a fluid-dispensing apparatus having a delivery line through which fluid is caused to pass under pressure, a meter in said line, a computer driven by said meter, means for resetting said computer to initial position, a shaft rotatable for actuating said resetting means, a cam on said shaft, a control valve in said line, means actuated by said cam during the resetting operation for opening said valve and independently actuated means for discontinuing the passage of fluid.

8. Control mechanism for a fluid-dispensing apparatus having a motor-driven pump, a meter-operated resettable computer, a rotatable shaft for resetting said computer to initial position, an actuating cam on said shaft, means actuated by said cam during the rotation of said shaft and prior to the completion of the resetting operation for effecting the delivery of fluid through said meter and independently actuated means for discontinuing the delivery of fluid.

9. Control mechanism for a fluid-dispensing apparatus having a motor-driven pump, a meter-operated resettable computer, a rotatable shaft for resetting said computer to initial position, an actuating cam on said shaft, means actuated by said cam during the rotation thereof and prior to the completion of the resetting operation for starting said motor and independently actuated means for stopping said motor.

10. Control mechanism for a fluid-dispensing apparatus having a motor-driven pump, a meter-operated resettable computer, a rotatable shaft for resetting said computer to initial position, an actuating cam on said shaft, means actuated by said cam during the rotation thereof and prior to the completion of the resetting operation for starting said motor and independently actuated means for stopping said motor.

11. Control mechanism for a fluid-dispensing apparatus having a switch-controlled motor-driven pump and a meter-operated resetting computer, said mechanism comprising a computer resetting shaft, a cam rotatable with said shaft, a plunger operably connected with said switch for opening the switch when in one position and closing it when in another position, a finger actuated by the rotation of said cam for moving said plunger to switch-closing position, and means actuated independently of said cam for moving said plunger to switch-closing position.

12. Control mechanism for a fluid-dispensing apparatus having a switch-controlled motor-driven pump and a meter-operated resetting computer, said mechanism comprising a computer resetting shaft, a cam rotatable with said shaft, a plunger operably connected with said switch for opening the switch when in one position and closing it when in another position, a finger actuated by the rotation of said cam for moving said plunger to switch-closing position, a dispensing nozzle, a support therefor when in inoperative position, and a lever associated with said support and actuated by the nozzle when placed thereon for moving said plunger independently of said cam to open said switch.

13. Control mechanism for fluid dispensing apparatus having means for controlling the flow of fluid therefrom, and a meter operated resettable computer, said mechanism comprising a computer resetting shaft, a member operably connected with said fluid control means for causing the flow of fluid when in one position and discontinuing the flow of fluid when in another position, means actuated by the rotation of said shaft during the resetting of the computer for moving said member to position for effecting the flow of fluid, and means actuated independently of said shaft for moving said member to the other position for discontinuing the flow of fluid.

14. Control mechanism for fluid dispensing apparatus having means for controlling the flow of fluid therefrom, and a meter operated resettable computer, said mechanism comprising a computer resetting shaft, a member operably connected with said fluid control means for causing the flow of fluid when in one position and discontinuing the flow of fluid when in another position, means actuated by the rotation of said shaft during the resetting of the computer for moving said member to position for effecting the flow of fluid, a dispensing nozzle, and means actuated by said nozzle and independently of said resetting shaft for moving said member to the other position for discontinuing the flow of liquid.

MAXIMILLIAN O. TRUDEAU.